United States Patent
Wu et al.

(10) Patent No.: US 9,941,632 B2
(45) Date of Patent: Apr. 10, 2018

(54) CARD HOLDER

(71) Applicant: Xiaomi Inc., Beijing (CN)

(72) Inventors: Fenghui Wu, Beijing (CN); Kesheng Yan, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/437,494

(22) Filed: Feb. 21, 2017

(65) Prior Publication Data

US 2017/0162982 A1  Jun. 8, 2017

Related U.S. Application Data

(63) Continuation of application No. PCT/CN2015/077824, filed on Apr. 29, 2015.

(30) Foreign Application Priority Data

Dec. 25, 2014 (CN) .......................... 2014 1 0826477

(51) Int. Cl.
*H01R 13/635* (2006.01)
*H04B 1/3816* (2015.01)
(Continued)

(52) U.S. Cl.
CPC ........... *H01R 13/635* (2013.01); *H01R 12/71* (2013.01); *H04B 1/3816* (2013.01); *H04B 1/3818* (2015.01)

(58) Field of Classification Search
CPC .... H01R 13/635; H01R 12/71; H04B 1/3818; H04B 1/3816
(Continued)

(56) References Cited

U.S. PATENT DOCUMENTS 2,051,425 A * 8/1936 Schlums .............. H01R 13/631
                                                          439/159
2,134,345 A * 10/1938 Sheeran ............... H01R 13/633
                                                          439/159
(Continued)

FOREIGN PATENT DOCUMENTS

CN       103414489 A    11/2013
CN       203406864 U     1/2014
(Continued)

OTHER PUBLICATIONS

International Search Report issued in Application No. PCT/CN2015/077824, mailed from the State Intellectual Property Office of the Peoples Republic of China dated Sep. 23, 2015.
(Continued)

*Primary Examiner* — Ross Gushi
(74) *Attorney, Agent, or Firm* — Finnegan, Henderson, Farabow, Garrett & Dunner LLP

(57) ABSTRACT

A card holder includes a card locker, a connector, and a card tray. The card locker includes a control button, a card fastener, and a housing having an opening. The connector includes a card-seat spring. The card tray is configured to be inserted into the connector through the opening. When the card fastener and the card tray are engaged with each other in a locked state, the card tray is pressed against the card-seat spring to cause the card-seat spring to be in a compressed state. When the control button controls the card fastener to move away from the card tray such that the card fastener and the card tray are in an unlocked state, the card-seat spring ejects the card tray through the opening by recovering from the compressed state to a normal state.

8 Claims, 8 Drawing Sheets

(51) Int. Cl.
*H04B 1/3818* (2015.01)
*H01R 12/71* (2011.01)

(58) Field of Classification Search
USPC .................................................. 439/159, 160
See application file for complete search history.

(56) References Cited

U.S. PATENT DOCUMENTS

| | | | | |
|---|---|---|---|---|
| 2,430,011 A * | 11/1947 | Gillentine | H01R 13/633 | 254/122 |
| 2,551,533 A * | 5/1951 | Gernheuser | H01R 13/633 | 174/66 |
| 2,571,046 A * | 10/1951 | Maisey | H01R 13/635 | 439/160 |
| 2,688,734 A * | 9/1954 | Welling | H01R 13/635 | 200/51 R |
| 2,696,594 A * | 12/1954 | Harrington | H01R 13/633 | 439/160 |
| 3,475,715 A * | 10/1969 | Venaleck | H01R 13/635 | 439/159 |
| 3,737,835 A * | 6/1973 | Clement | H01R 13/635 | 439/155 |
| 4,326,763 A * | 4/1982 | Ristovski | H01R 13/635 | 439/108 |
| 5,679,014 A * | 10/1997 | Lan-Jen | H01R 13/6335 | 439/160 |
| 5,915,997 A * | 6/1999 | Lan-Jen | H01R 13/6335 | 439/694 |
| 5,964,605 A * | 10/1999 | Heydorn | H01R 13/633 | 439/157 |
| 6,062,883 A * | 5/2000 | Schreiber | H01R 13/633 | 439/159 |
| 6,095,849 A * | 8/2000 | Stekelenburg | H01R 13/6335 | 439/160 |
| 6,364,675 B1 * | 4/2002 | Brauer | H01R 13/635 | 439/159 |
| 6,540,533 B1 * | 4/2003 | Schreiber | H01R 13/633 | 439/159 |
| 6,716,044 B2 * | 4/2004 | Bertke | H01R 13/6335 | 439/159 |
| 6,913,475 B2 * | 7/2005 | Hsu | H01R 13/6335 | 439/160 |
| 7,125,258 B2 * | 10/2006 | Nakakubo | G06K 19/07741 | 439/328 |
| 7,344,393 B2 * | 3/2008 | Buller | H01R 13/635 | 439/152 |
| 7,628,626 B1 * | 12/2009 | Tseng | H01R 13/6335 | 439/160 |
| 8,083,531 B1 * | 12/2011 | Ourasanah | H01R 13/6335 | 439/159 |
| 8,553,419 B2 * | 10/2013 | Luo | G06K 13/0831 | 312/120 |
| 8,591,240 B2 * | 11/2013 | Jenks | G11B 17/00 | 439/159 |
| 8,767,381 B2 * | 7/2014 | Shukla | G06F 1/1658 | 361/679.01 |
| 8,770,996 B2 * | 7/2014 | Hsu | H01R 13/635 | 439/159 |
| 8,777,645 B2 * | 7/2014 | Cao | H01R 13/6275 | 439/159 |
| 8,794,986 B2 | 8/2014 | Takasaki et al. | | |
| 8,814,582 B2 * | 8/2014 | Lee | G06K 13/0812 | 439/159 |
| 8,947,885 B2 * | 2/2015 | Wu | G06F 1/1613 | 361/679.31 |
| 9,164,539 B2 * | 10/2015 | Wu | G06F 1/1613 | |
| 9,311,571 B2 * | 4/2016 | Lei | G06K 13/0831 | |
| 9,337,578 B2 | 5/2016 | Wang | | |
| 9,350,833 B2 * | 5/2016 | Li | G06F 1/1613 | |
| 9,379,487 B2 * | 6/2016 | Okoshi | H01R 13/633 | |
| 9,405,334 B2 * | 8/2016 | Gong | G06F 1/183 | |
| 9,414,510 B2 * | 8/2016 | Lei | H05K 5/0295 | |
| 9,437,966 B2 * | 9/2016 | Gagne | H01R 13/62 | |
| 9,461,411 B2 * | 10/2016 | Chuang | H01R 13/6581 | |
| 9,529,391 B2 * | 12/2016 | Ely | G06F 1/1656 | |
| 9,537,258 B2 * | 1/2017 | Bencuya | H01R 13/633 | |
| 9,622,364 B2 * | 4/2017 | Baek | G06F 1/1613 | |
| 9,625,944 B2 * | 4/2017 | Weber | G06F 1/163 | |
| 9,627,797 B2 * | 4/2017 | Song | H01R 13/5213 | |
| 9,658,641 B2 * | 5/2017 | Stephens | G06F 1/00 | |
| 2002/0064983 A1 * | 5/2002 | Patey | H01R 13/7038 | 439/152 |
| 2003/0008539 A1 * | 1/2003 | Bertke | H01R 13/6335 | 439/160 |
| 2006/0030188 A1 * | 2/2006 | Pan | H01R 13/633 | 439/160 |
| 2006/0154506 A1 * | 7/2006 | Kikuchi | H01R 13/629 | 439/159 |
| 2008/0064239 A1 | 3/2008 | Li | | |
| 2008/0132120 A1 | 6/2008 | Tsai | | |
| 2010/0053913 A1 | 3/2010 | Lee et al. | | |
| 2011/0151695 A1 * | 6/2011 | Yang | H01R 12/7094 | 439/159 |
| 2011/0255252 A1 * | 10/2011 | Sloey | H04B 1/3816 | 361/752 |
| 2012/0162925 A1 * | 6/2012 | Luo | G06K 13/0825 | 361/727 |
| 2012/0195013 A1 * | 8/2012 | Trzaskos | G06K 13/0831 | 361/754 |
| 2013/0005167 A1 * | 1/2013 | Matsumoto | H01R 12/7094 | 439/159 |
| 2013/0005168 A1 * | 1/2013 | Ye | G06K 13/08 | 439/159 |
| 2013/0286608 A1 * | 10/2013 | Liang | H05K 7/1402 | 361/754 |
| 2013/0309885 A1 * | 11/2013 | Liu | H01R 13/629 | 439/153 |
| 2013/0314854 A1 * | 11/2013 | Chung | H05K 5/0239 | 361/679.01 |
| 2013/0335896 A1 * | 12/2013 | Gao | H05K 7/1461 | 361/679.01 |
| 2014/0017920 A1 | 1/2014 | Takasaki et al. | | |
| 2014/0029206 A1 * | 1/2014 | Wittenberg | H05K 1/18 | 361/728 |
| 2014/0029211 A1 * | 1/2014 | Gao | H05K 5/0091 | 361/747 |
| 2014/0141642 A1 * | 5/2014 | Liao | G06K 7/0021 | 439/372 |
| 2014/0154926 A1 * | 6/2014 | Cao | G06K 7/04 | 439/634 |
| 2014/0185199 A1 * | 7/2014 | Chen | H05K 5/0295 | 361/679.01 |
| 2014/0362548 A1 | 12/2014 | Liu et al. | | |
| 2015/0099383 A1 * | 4/2015 | Takasaki | H05K 7/1409 | 439/159 |
| 2015/0155900 A1 * | 6/2015 | Myers | G06K 13/08 | 455/558 |
| 2015/0188257 A1 * | 7/2015 | Lin | G06K 13/0812 | 439/159 |
| 2015/0263455 A1 * | 9/2015 | Van der Steen | H01R 13/641 | 439/159 |
| 2015/0333444 A1 * | 11/2015 | Wang | H01R 13/633 | 439/159 |
| 2016/0036143 A1 * | 2/2016 | Motohashi | H01R 13/635 | 439/160 |
| 2016/0073540 A1 * | 3/2016 | Chang | H04B 1/3818 | 361/756 |
| 2016/0126997 A1 * | 5/2016 | Wu | H04B 1/3818 | 455/575.1 |
| 2017/0162982 A1 * | 6/2017 | Wu | H04B 1/3816 | |
| 2017/0179659 A1 * | 6/2017 | Motohashi | H01R 12/721 | |

FOREIGN PATENT DOCUMENTS

| | | |
|---|---|---|
| CN | 103855528 A | 6/2014 |
| CN | 203734002 U | 7/2014 |
| CN | 203747140 U | 7/2014 |
| CN | 104158927 A | 11/2014 |

(56) References Cited

FOREIGN PATENT DOCUMENTS

| | | |
|---|---|---|
| CN | 104241895 A | 12/2014 |
| CN | 104518815 A | 4/2015 |
| JP | 2006-024543 A | 1/2006 |
| JP | 2012-146489 A | 8/2012 |
| JP | 2013-134976 A | 7/2013 |
| JP | 2014-7094 A | 1/2014 |
| JP | 2014-170627 A | 9/2014 |
| KR | 20-2000-0010993 A | 6/2000 |
| KR | 10-2010-0063974 A | 6/2010 |
| RU | 2448412 C2 | 4/2012 |

OTHER PUBLICATIONS

Extended European Search Report issued in European Application No. 15201704.2, mailed from the European Patent Office, dated May 4, 2016.
Russian Office Action issued in Application No. 2015131021/07(047729), dated Nov. 21, 2016, mailed from the Russian Federal Service for Intellectual Property.

\* cited by examiner

CARD HOLDER

CROSS-REFERENCE TO RELATED APPLICATIONS

This application is a continuation of International Application No. PCT/CN2015/077824, filed Apr. 29, 2015, which is based upon and claims priority to Chinese Patent Application No. CN201410826477.5, filed Dec. 25, 2014, the entire contents of both of which are incorporated herein by reference.

TECHNICAL FIELD

The present disclosure relates to card holding and, more particularly, to a card holder.

BACKGROUND

A terminal with an irremovable battery usually has a card holder for accommodating a card, such as a subscriber identity module (SIM) card, such that a user can replace the card without removing the battery from the terminal.

In conventional technology, the card holder includes a card tray for holding the card, and a body perpendicular to a first side face of the card tray. The body is formed by an outward extension from the first side face. The body is longer than the first side face. The card tray has a second side face opposite to the first side face. The second side face abuts a first end of a first lever. A second end of the first lever extends outward to form a rotation shaft. The rotation shaft extends outward to form a second lever. The first and second levers form an acute angle at the card tray side. An end of the second lever extends outward to form a third lever parallel to a third side face of the card tray. A cylinder opening is formed through the body at a projection position of the third lever on the body.

To eject the card tray, the user inserts a pin through the cylinder opening and pushes the third lever to move inward. The second lever and the rotation shaft push the first lever to move outward, thereby pushing the card tray outward.

SUMMARY

In accordance with the present disclosure, there is provided a card holder including a card locker, a connector, and a card tray. The card locker includes a control button, a card fastener, and a housing having an opening. The connector includes a card-seat spring. The card tray is configured to be inserted into the connector through the opening. When the card fastener and the card tray are engaged with each other in a locked state, the card tray is pressed against the card-seat spring to cause the card-seat spring to be in a compressed state. When the control button controls the card fastener to move away from the card tray such that the card fastener and the card tray are in an unlocked state, the card-seat spring ejects the card tray through the opening by recovering from the compressed state to a normal state.

It shall be appreciated that the above general description and the detailed description hereinafter are only illustrative but not for limiting the present disclosure.

BRIEF DESCRIPTION OF THE DRAWINGS

The accompanying drawings herein, which are incorporated into and constitute a part of the specification, illustrate embodiments consistent with the present disclosure, and with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects of the present disclosure as recited in the appended claims.

Figure 1:
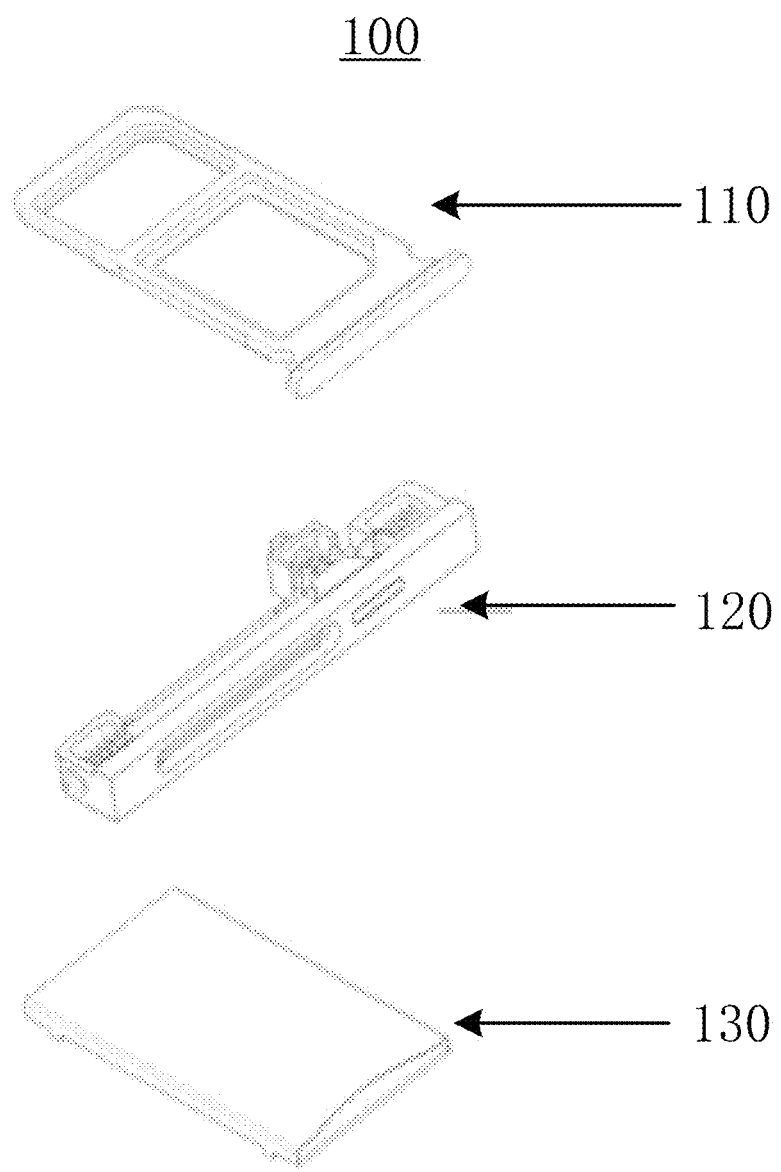
FIG. 1 is a block diagram illustrating a card holder according to an exemplary embodiment of the present disclosure.

FIG. 1 is a block diagram illustrating a card holder 100 according to an exemplary embodiment of the present disclosure. The card holder 100 can be used, for example, in a terminal. As illustrated in FIG. 1, the card holder 100 includes a card tray 110, a card locker 120, and a connector 130. The card locker 120 includes a card fastener and a control button. The connector 130 includes a card-seat spring.

When the card locker 120 controls the card fastener to move away from the card tray 110 via the control button, the card-seat spring recovers from a compressed state to a normal state, and the card tray 110 is ejected outward from a first opening extending along a housing of the card locker 120.

When the card tray 110 moves inward through the first opening, the card-seat spring is compressed from the normal state to the compressed state, such that the card fastener and the card tray 110 are in a locked state.

Accordingly, with the card holder provided in the present disclosure, when the card locker controls the card fastener to be away from the card tray by means of the control button, the spring in the card seat recovers from a compressed state to a normal state, and the card tray is ejected outward from a first opening extending along a housing of the card locker, such that a user may control ejection of the card tray via the control button, with no need of using an ejection pin.

Figure 2:
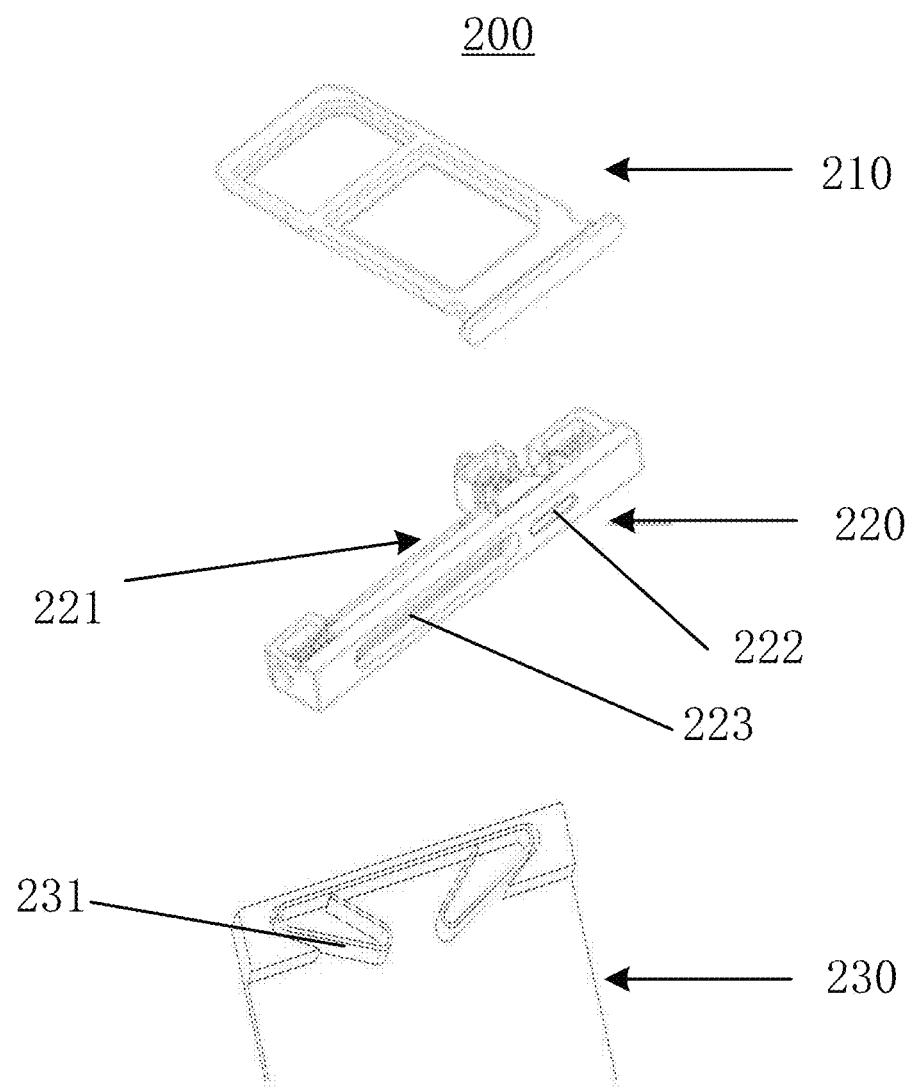
FIG. 2 is a block diagram illustrating a card holder according to another exemplary embodiment of the present disclosure.

FIG. 2 is a block diagram illustrating a card holder 200 according to another exemplary embodiment of the present disclosure. The card holder 200 can be used, for example, in a terminal. As illustrated in FIG. 2, the card holder 200 includes a card tray 210, a card locker 220, and a connector 230. The card locker 220 includes a card fastener 221 and a control button 222. The card locker 220 also includes a first opening 223 extending along a housing of the card locker 220. The connector 230 includes a card-seat spring 231. In accordance with the present disclosure, the card locker 220 and the connector 230 operate together to control the ejection and retraction of the card tray 210. After the card tray 210 is ejected, a user can replace the card in the card tray 210. After the card tray 210 is retracted, the terminal can use the card normally.

According to the present disclosure, when the control button 222 is pressed, the card fastener 221 moves away from the card tray 210. This allows the card-seat spring 231 to recover from a compressed state to a normal state, ejecting the card tray 210 outward through the first opening 223.

Figure 3:
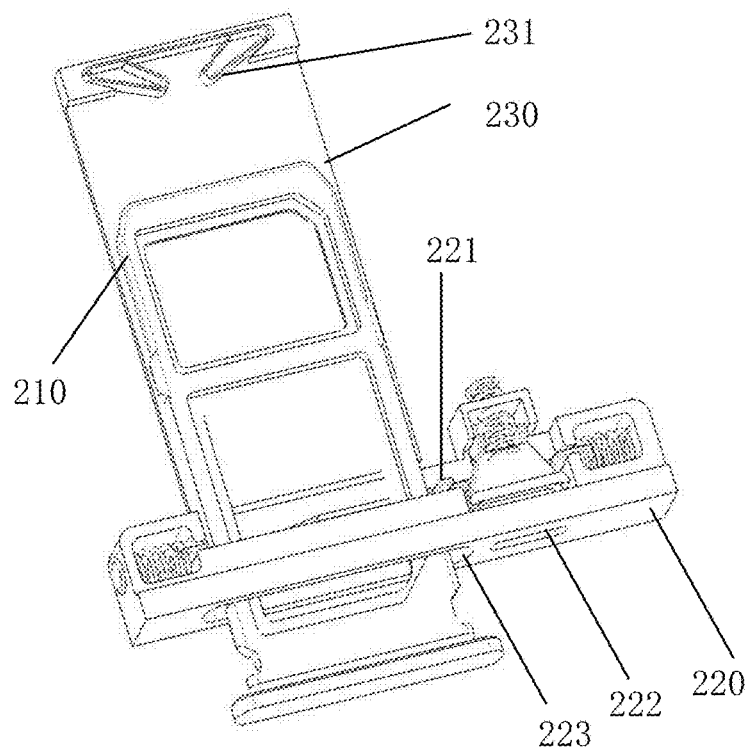
FIG. 3 is a schematic diagram illustrating the ejection of a card tray according to an exemplary embodiment of the present disclosure.

FIG. 3 is schematically illustrates the ejection of the card tray 210. When a user presses the control button 222, the control button 222 triggers the card fastener 221 in the card locker 220 to move away from the card tray 210, such that the card tray 210 and the card fastener 221 disengage from a locked state. As a result, the card tray 210 becomes freely movable along the connector 230 and through the first opening 223. According to the present disclosure, when the card tray and the card fastener 221 are in the locked state, the card tray 210 and the card-seat spring 231 abut each other and the card-seat spring 231 is in a compressed state. When the card tray 210 and the card fastener 221 disengage from the locked state, the card-seat spring 231 recovers from the compressed state to a normal state, pushing the card tray 210 out through the first opening 223. In other words, the card tray 210 is ejected from the first opening 223.

Figure 4:
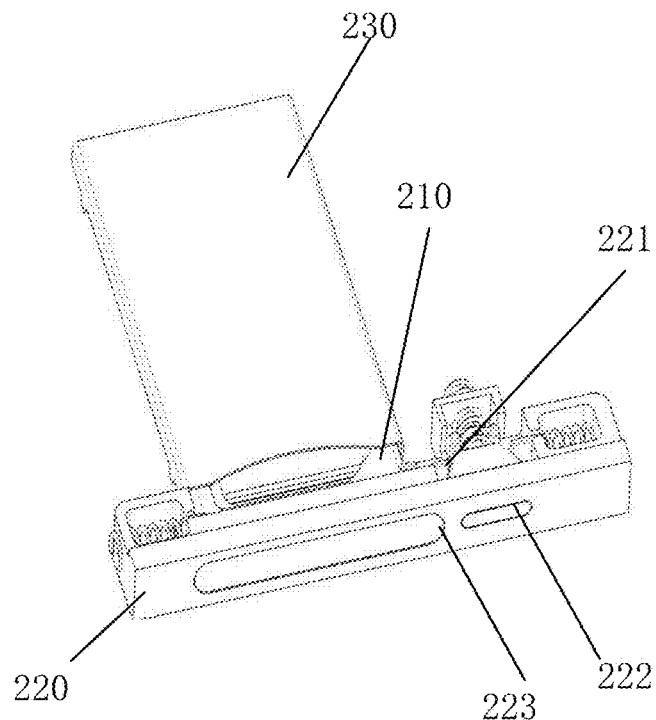
FIG. 4 is a schematic diagram illustrating the state of the card holder after the card tray returns to a lock state according to an exemplary embodiment of the present disclosure.

On the other hand, when the card tray 210 moves inward through the first opening 223, for example, as a result of the user pushing the card tray 210 inward, the card-seat spring 231 is compressed from the normal state to the compressed state. In the meantime, the card fastener 221 moves toward the card tray 210, such that the card fastener 221 and the card tray 210 return to the locked state. The resulting state is schematically shown in FIG. 4.

Figure 5:
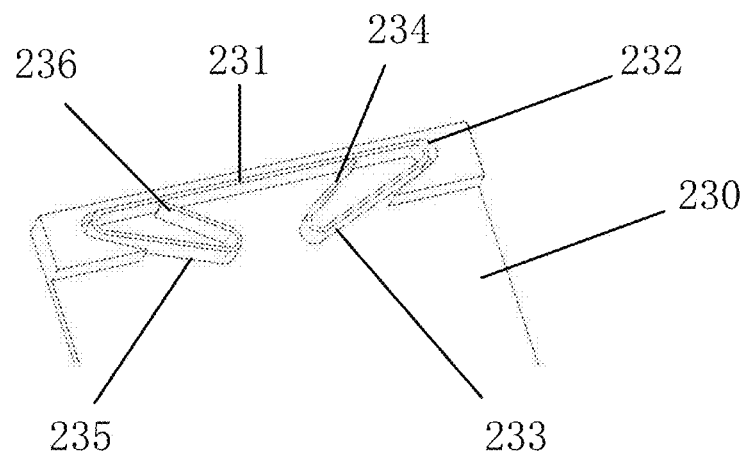
FIG. 5 is a schematic structural diagram illustrating an example of a connector according to an exemplary embodiment of the present disclosure.

FIG. 5 schematically shows an example of the connector 230 consistent with embodiments of the present disclosure. As shown in FIG. 5, the connector 230 includes a card-seat spring 231 configured to eject the card tray 210 is ejected. In some embodiments, the card-seat spring 231 can be replaced by another type of spring or another elastic member, which is capable of ejecting the card tray 210. The connector 230 further includes a connector body, in which an open triangular groove 232 is formed. The open triangular groove 232 extends along the connector body and is configured to accommodate the card-seat spring 231. In some embodiments, the card-seat spring 231 or other elastic member configured to eject the card tray 210 is not installed in a groove, and the open triangular groove 232 does not need to be provided in the connector body.

As shown in FIG. 5, the card-seat spring 231 has a triangular shape. Specifically, the card-seat spring 231 includes a first sloping side 233. A part of the first sloping side 233 is bent inward to form a second sloping side 234. The first sloping side 233 and the second sloping side 234 form an acute angle. The card-seat spring 231 further includes a third sloping side 235, a part of which is bent inward to form a fourth sloping side 236. The third sloping side 235 and the fourth sloping side 236 form an acute angle. When the card tray 210 is pushed inward, the first sloping side 233 and the third sloping side 235 are also pushed by the card tray 210 to move inward. As a result, the second sloping side 234 and the fourth sloping side 236 abut a bottom side of the triangle-shaped card-seat spring 231, causing the card-seat spring 231 to be in the compressed state.

In some embodiments, an upper surface, a lower surface, a left surface, and a right surface of the connector body of the connector 230 extend along a direction opposite to a compression direction of the card-seat spring 231, to form a protection sleeve and the card-seat spring 231 is enclosed by the protection sleeve. This situation is schematically shown in FIG. 4. The protection sleeve isolates the card from other components in the terminal. The upper, lower, left, and right surfaces of the connector body extend for a predetermined length smaller than or equal to a length of the card tray 210. In some embodiments, the predetermined length is smaller than the length of the card tray 210, to ensure that the card-seat spring 231 is in the compressed state when the card tray 210 is retracted.

Returning to FIG. 5, the open triangular groove 232 has two sloping sides not intersecting each other.

Figure 6:
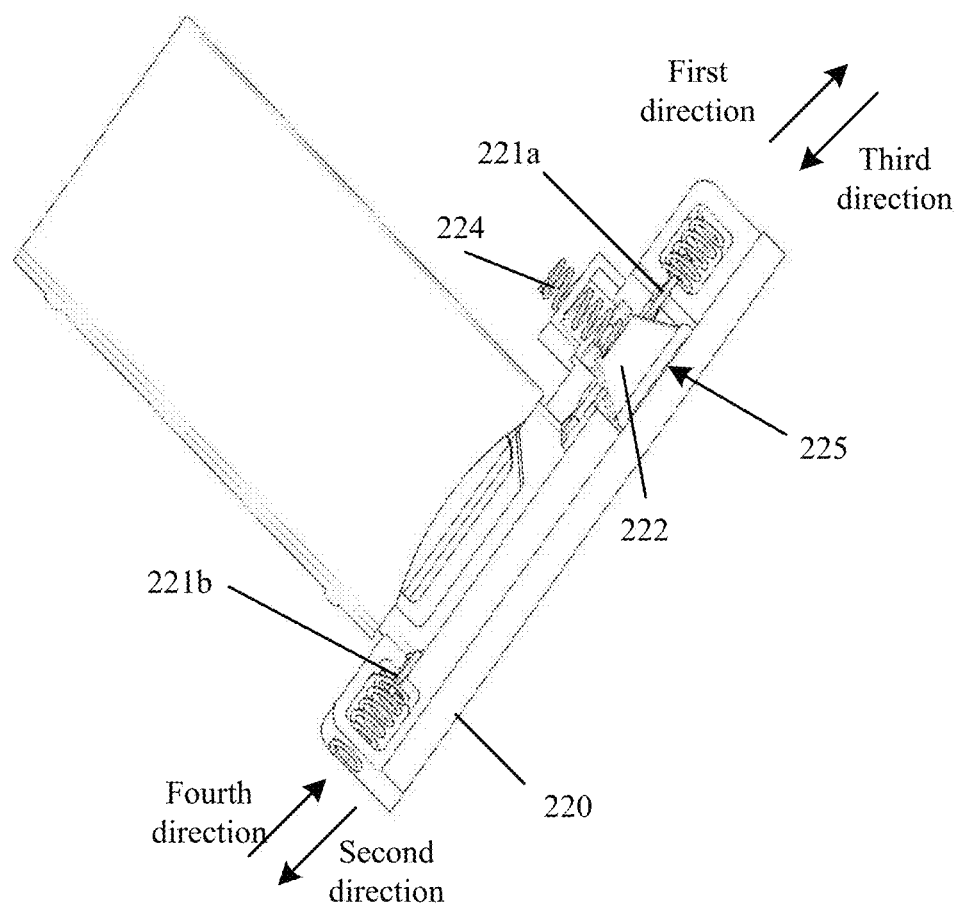
FIG. 6 is a schematic structural diagram illustrating features of the card holder according to an exemplary embodiment of the present disclosure.

FIG. 6 schematically illustrates details of the card holder 210 including an example of the card locker 220 consistent with embodiments of the present disclosure. As shown in FIG. 6, the card fastener 221 includes a first card fastening component 221a and a second card fastening component 221b. The card locker 220 further includes a first spring 224 abutting the control button 222, and a second opening 225 extending along the housing of the card locker 220 and corresponding to the control button 222.

According to the present disclosure, when the control button 222 moves inward from the second opening 225, for example, as a result of the user pressing the control button 222, the first card fastening component 221a moves along a first direction away from the card tray 210, the second card fastening component 221b moves along a second direction away from the card tray 210, and the first spring 224 is compressed from a normal state to a compressed state. On the other hand, when the first spring 224 recovers from the compressed state to the normal state, for example, as a result of the user releasing the control button 222, the first card fastening component 221a moves along a third direction toward the card tray 210, the second card fastening component 221b moves along a fourth direction toward the card tray 210, and the first spring 224 pushes the control button 222 to move outward. As a result, the first card fastening component 221a and the card tray 210 return to the locked state. The second card fastening component 221*b* and the card tray 210 also return to the locked state.

Figure 7:
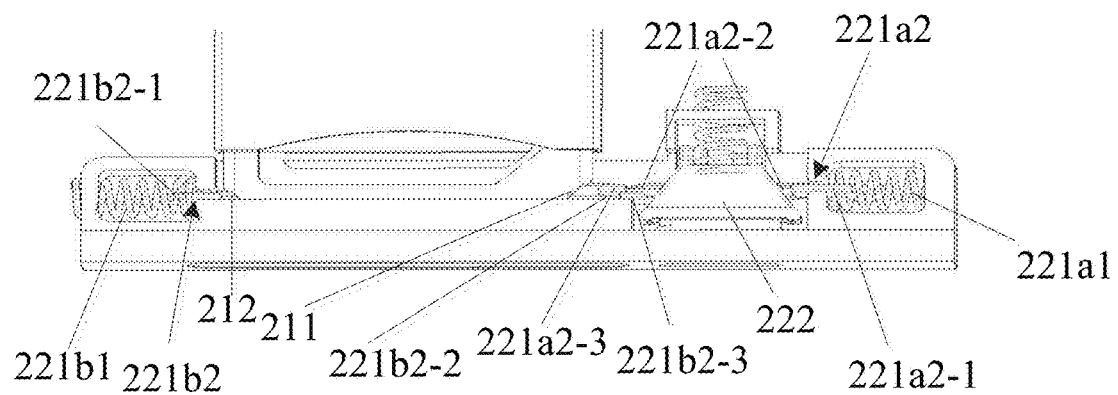
FIG. 7 is a schematic structural diagram illustrating an example of a card fastener according to an exemplary embodiment of the present disclosure.

FIG. 7 schematically shows an example of the card fastener 221, which includes the first card fastening component 221*a* and the second card fastening component 221*b*. The first card fastening component 221*a* includes a second spring 221*a*1 and a first locking rod 221*a*2. The first locking rod 221*a*2 has a first end 221*a*2-1 abutting the second spring 221*a*1.

The first locking rod 221*a*2 includes a first rod body. A first rod groove 221*a*2-2 is formed in the first rod body and extends along the first rod body. As used herein, the first rod groove 221*a*2-2 refers to a U-shape recess portion of the first locking rod 221*a*2 as shown in FIG. 7. The first rod groove 221*a*2-2 has two groove side faces. One of the groove side faces that is closer to the first end 221*a*2-1 abuts a first button side face of the control button 222. For example, as shown in FIG. 7, the groove side face on the right of the first rod groove 221*a*2-2 is closer to the first end 221*a*2-1 and the first button side face of the control button 222 is on the right of the control button 222. The first locking rod 221*a*2 further includes a second end 221*a*2-3 opposite to the first end 221*a*2-1. The second end 221*a*2-3 abuts a first tray groove 211 of the card tray 210.

As described above, the first locking rod 221*a*2 abuts the second spring 221*a*1 via the first end 221*a*2-1. However, in some embodiments, the first locking rod 221*a*2 can be coupled to the second spring 221*a*1 via the first end 221*a*2-1.

In some embodiments, as shown in FIG. 7, the control button 222 is a trapezoidal button. A side length of the control button 222 on the outer side of the terminal is greater than a side length of the control button 222 on the inner side of the terminal.

As shown in FIG. 7, when the user presses the control button 222, the control button 222 pushes the first locking rod 221*a*2, via the first button side face that abuts the groove side face of the first rod groove 221*a*2-2, to move along the first direction, causing the second end 221*a*2-3 to disengage from the first tray groove 211. As a result, the first locking rod 221*a*2 and the card tray 210 are not in the locked state, but instead enter into an unlocked state. In this case, the first locking rod 221*a*2 compresses the second spring 221*a*1 so that the second spring 221*a*1 changes from the normal state to the compressed state.

When the user releases the control button 222, the second spring 221*a*1 recovers from the compressed state to the normal state, and pushes the first locking rod 221*a*2 to move along the third direction. As a result, the second end 221*a*2-3 abuts the first tray groove 211, such that the first locking rod 221*a*2 and the card tray 210 are in the locked state.

Similarly, as shown in FIG. 7, the second card fastening component 221*b* includes a third spring 221*b*1 and a second locking rod 221*b*2. The second locking rod 221*b*2 has a third end 221*b*2-1 abutting the third spring 221*b*1.

The second locking rod 221*b*2 includes a second rod body. A second rod groove 221*b*2-2 is formed in the second rod body and extends along the second rod body. As used herein, the second rod groove 221*b*2-2 refers to a recess portion of the second locking rod 221*b*2. The second rod groove 221*b*2-2 has two groove side faces. One of the groove side faces that is closer to the third end 221*b*2-1 abuts a second tray groove 212 of the card tray 210. The second locking rod 221*b*2 further includes a fourth end 221*b*2-3 opposite to the third end 221*b*2-1. The fourth end 221*b*2-3 abuts a second button side face of the control button 222. For example, as shown in FIG. 7, the second button side face of the control button 222 is on the left of the control button 222.

As described above, the second locking rod 221*b*2 abuts the third spring 221*b*1 via the third end 221*b*2-1. However, in some embodiments, the second locking rod 221*b*2 can be coupled to the third spring 221*b*1 via the third end 221*b*2-1.

As shown in FIG. 7, when the user presses the control button 222, the control button 222 pushes the second locking rod 221*b*2, via the second button side face that abuts the fourth end 221*b*2-3, to move along the second direction. Since the groove side face of the second rod groove 221*b*2-2 that is closer to the third end 221*b*2-1 abuts the second tray groove 212 of the card tray 210, the third end 221*b*2-1 no longer abut the second tray groove 212. As a result, the second locking rod 221*b*2 and the card tray 210 are not in the locked state, but enter into the unlocked state. In this case, the third end 221*b*2-1 of the second locking rod 221*b*2 compresses the third spring 221*b*1 from the normal state to the compressed state.

When the user releases the control button 222, the third spring 221*b*1 recovers from the compressed state to the normal state, and pushes the second locking rod 221*b*2 to move along the fourth direction. As a result, the groove side face of the second rod groove 221*b*-2 that is closer to the third end 221*b*2-1 abuts the second tray groove 212, such that the second locking rod 221*b*2 and the card tray 210 are in the locked state.

Figure 8:
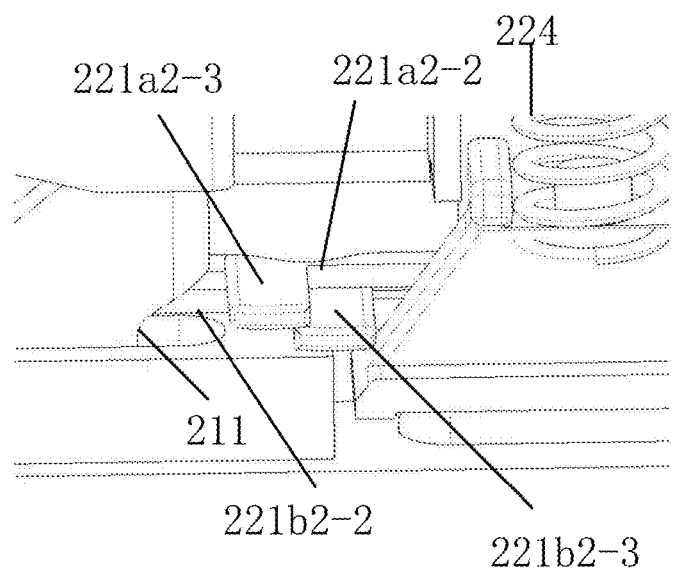
FIG. 8 is an enlarged view of a portion of the card fastener according to an exemplary embodiment of the present disclosure.
Figure 9:
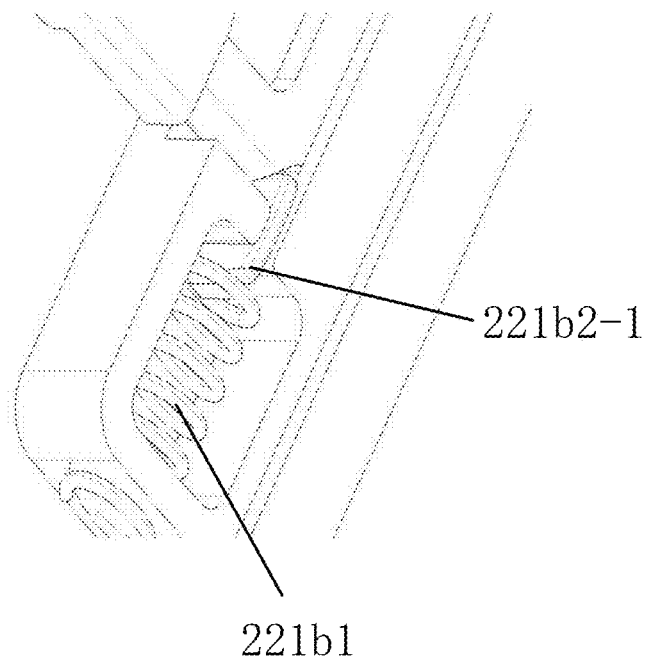
FIG. 9 is an enlarged view of another portion of the card fastener according to an exemplary embodiment of the present disclosure.

FIG. 8 is an enlarged view of a portion of the card fastener 221. FIG. 9 is an enlarged view of another portion of the card fastener 221.

Figure 10:
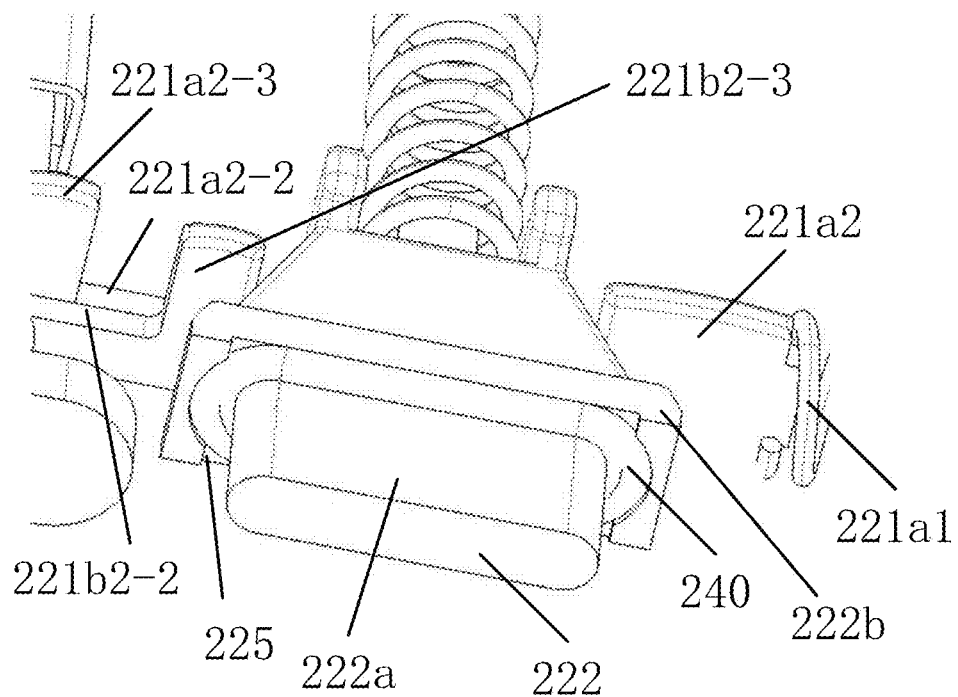
FIG. 10 is a perspective view of the card holder showing a first sealing ring according to an exemplary embodiment of the present disclosure.
Figure 11:
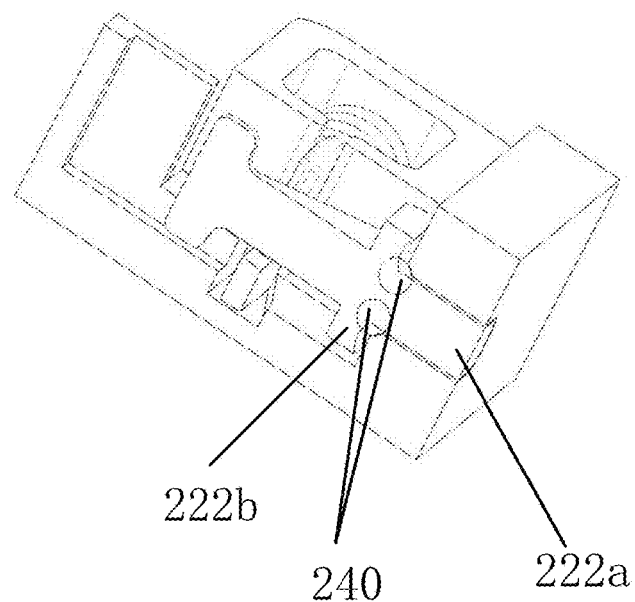
FIG. 11 is a cross-sectional view of the card holder showing the first sealing ring according to an exemplary embodiment of the present disclosure.

In some embodiments, as shown in the perspective view of FIG. 10 and the cross-sectional view of FIG. 11, the card holder 200 further includes a first sealing ring 240, which is positioned at a joint between a first button body 222*a* and a second button body 222*b* of the control button 222, and abuts the housing of the card locker 220. The second button body 222*b* is perpendicular to the first button body 222*a* and is formed by extending the first button body 222*a*. The first button body 222*a* mates with the second opening 225. The first sealing ring 240 is configured to seal the second opening 225 and the control button 222, improving the water-proofing and dust-proofing performance of the terminal.

Figure 12:
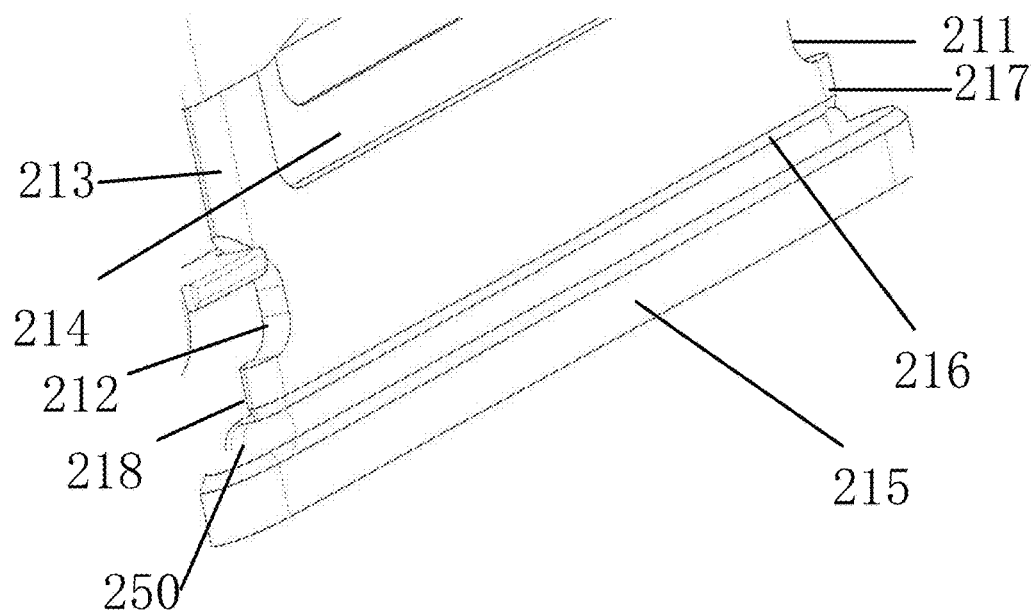
FIG. 12 is an enlarged view of a portion of the card tray according to an exemplary embodiment of the present disclosure.

FIG. 12 is an enlarged view of a portion of the card tray 210. As shown in FIG. 12, the card tray 210 includes a tray body 213. The tray body 213 includes at least one card opening 214 extending along the tray body 213. A cover body 215 perpendicular to the tray body 213 is formed by outward extension of the tray body 213 along a side face of the tray body 213. The cover body 215 mates with the first opening 223.

As shown in FIG. 12, the tray body 213 has an upper tray face 216, a first side tray face 217, and a second side tray face 218. The first side tray face 217 and the second side tray face 218 are perpendicular to the upper tray face 216. The first tray groove 211 is formed on the first side tray face 217, and the second tray groove 212 is formed on the second side tray face 218.

According to the present disclosure, the card opening 214 can be designed according to the shape of the card used in the terminal. For example, the card opening 214 can be arranged for a memory card or for a SIM card. Since the SIM cards may be in different shapes, different card openings 214 can be arranged according to the specific shape of the SIM card used. In some embodiments, the card tray 210 may have more than one card opening for accommodating multiple cards, such as a memory card and a SIM card, or multiple SIM cards.

The first tray groove 211 does not intersect with the card opening 214, and the second tray groove 212 does not intersect with the card opening 214.

Figure 13:
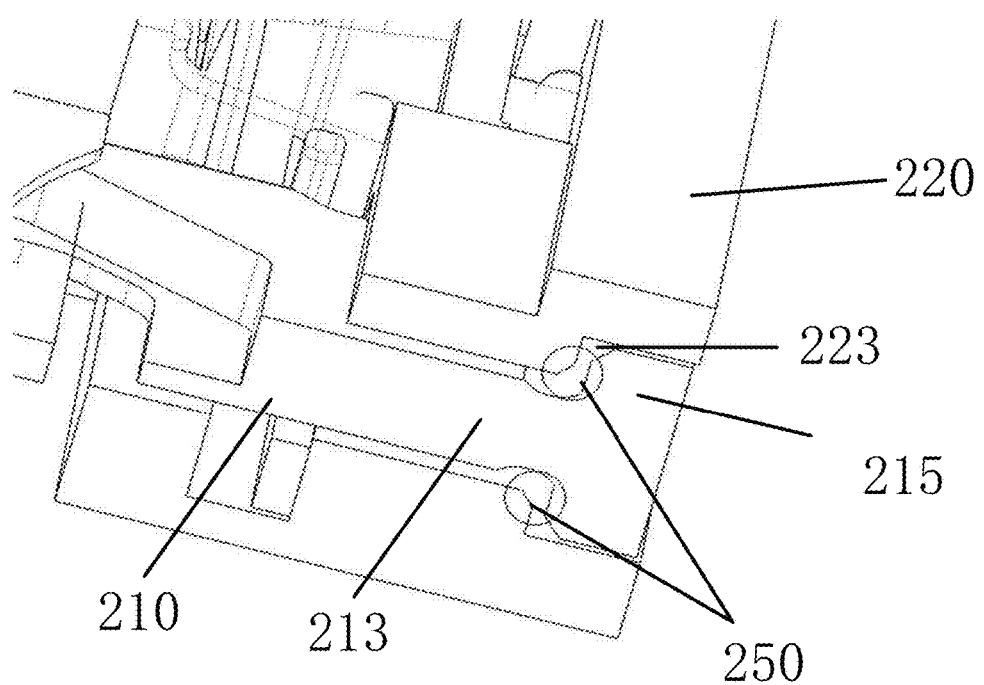
FIG. 13 is a cross-sectional view of the card tray showing a second sealing ring according to an exemplary embodiment of the present disclosure.

In some embodiments, as shown in the perspective view of FIG. 12 and the cross-sectional view of FIG. 13, the card holder 200 further includes a second sealing ring 250 positioned at a joint between the tray body 213 and the cover body 215. The second sealing ring 250 is configured to seal the first opening 223 and the card tray 210, improving the water-proofing and dust-proofing performance of the terminal.

In accordance with the present disclosure, there is no need to use a pin when replacing the card in a terminal. As such, the efficiency of replacing the card is improved.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A card holder, comprising:
 a card locker including:
  a control button;
  a card fastener including a first card fastening component and a second card fastening component; and
  a housing having an opening;
 a connector including a card-seat spring; and
 a card tray configured to be inserted into the connector through the opening,
 wherein:
  when the card fastener and the card tray are engaged with each other in a locked state, the card tray is pressed against the card-seat spring to cause the card-seat spring to be in a compressed state, and
  when the control button controls the card fastener to move away from the card tray such that the card fastener and the card tray are in an unlocked state, the card-seat spring ejects the card tray through the opening by recovering from the compressed state to a normal state,
 wherein the first card fastening component includes:
  a first rod spring; and
  a first locking rod including:
   a first end abutting the first rod spring;
   a second end abutting a first tray groove of the card tray; and
   a first rod body having a first rod groove extending along the first rod body, a side face of the first rod groove that is close to the first end abutting a first side face of the control button, and
 wherein the second card fastening component includes:
  a second rod spring; and
  a second locking rod including:
   a third end abutting the second rod spring;
   a fourth end abutting a second side face of the control button; and
   a second rod body having a second rod groove extending along the second rod body, a side face of the second rod groove that is close to the third end abutting a second tray groove of the card tray.

2. The card holder according to claim 1, wherein:
 the connector further includes a connector body having an open triangular groove, and
 the card-seat spring has a triangular shape and is seated in the open triangular groove, the card-seat spring including:
  a bottom side;
  a first sloping side, a part of the first sloping side being bent toward the bottom side to form a second sloping side, and the first sloping side and the second sloping side forming a first acute angle; and
  a third sloping side, a part of the third sloping side being bent toward the bottom side to form a fourth sloping side, and the third sloping side and the fourth sloping side forming a second acute angle.

3. The card holder according to claim 2, wherein an upper surface, a lower surface, a left surface, and a right surface of the connector body extend toward a direction opposite to a compression direction of the card-seat spring for a predetermined length, the predetermined length being less than or equal to a length of the card tray.

4. The card holder according to claim 1, wherein:
 the opening is a first opening,
 the housing further includes a second opening extending along the housing,
 the control button includes:
  a first button body; and
  a second button body perpendicular to the first button body, the second button body being formed by an extension of the first button body and mating with the second opening, and
 the card holder further includes:
  a sealing ring positioned at a joint between the first button body and the second button body and abutting the housing.

5. The card holder according to claim 1, wherein:
 the card locker further includes:
  a button spring abutting the control button,
 wherein:
  the first card fastening component is arranged to one side of the control button and configured to:
   when the control button moves inward to cause the button spring to compress to a compressed state, move along a first direction away from the card tray; and
   when the button spring recovers from the compressed state, move along a third direction approaching the card tray; and
  the second card fastening component is arranged to another side of the control button and configured to:
   when the control button moves inward, move along a second direction away from the card tray, the second direction being opposite to the first direction; and
   when the button spring recovers from the compressed state, move along a fourth direction approaching the card tray, the fourth direction being opposite to the third direction.

6. The card holder according to claim 5, wherein the card tray includes:
 a tray body having at least one card opening, an upper tray face, and a side tray face perpendicular to the upper tray face; and a cover body perpendicular to the tray body and being formed by outward extension of the tray body along the upper tray face, the first tray groove being formed on the side tray face.

7. The card holder according to claim 6, wherein:

the side tray face is a first side tray face, the tray body further has a second side tray face perpendicular to the upper tray face, and the second tray groove is formed on the second side tray face.

8. The card holder according to claim 6, wherein:

the sealing ring is a first sealing ring, and the card holder further includes a second sealing ring positioned at a joint between the tray body and the cover body.

* * * * *